US011861249B1

(12) United States Patent
Ybanez et al.

(10) Patent No.: US 11,861,249 B1
(45) Date of Patent: Jan. 2, 2024

(54) FILE TRANSFER SYSTEM THAT TRANSFERS FILE AMONG PLURALITY OF IMAGE FORMING APPARATUSES

(71) Applicant: KYOCERA Document Solutions Inc., Osaka (JP)

(72) Inventors: Maria Johanna Ybanez, Osaka (JP); Romel Dianon, Jr., Osaka (JP); Peter James Bulat-Ag, Osaka (JP); Gerald Galanida, Osaka (JP); Hazel Ozon, Osaka (JP); Fritzer Abapo, Osaka (JP); Roy Vincent Maranon, Osaka (JP); Keanu Go, Osaka (JP); July Descartin, Osaka (JP); J'Mark Ramos, Osaka (JP); Eliot Emerson Uy, Osaka (JP); Kenneth Kienzle Arrieta, Osaka (JP); Dinnel Cabiles, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/222,728

(22) Filed: Jul. 17, 2023

(30) Foreign Application Priority Data

Jul. 27, 2022 (JP) ................................ 2022-119672

(51) Int. Cl.
*G06F 3/12* (2006.01)
*H04L 67/10* (2022.01)
*H04L 67/06* (2022.01)

(52) U.S. Cl.
CPC .......... *G06F 3/1236* (2013.01); *G06F 3/1203* (2013.01); *G06F 3/1287* (2013.01); *H04L 67/06* (2013.01); *H04L 67/10* (2013.01)

(58) Field of Classification Search
None
See application file for complete search history.

(56) References Cited

U.S. PATENT DOCUMENTS 10,783,121 B2 * 9/2020 Brand .................. G06F 16/182
11,178,225 B2 11/2021 Brand
2009/0248693 A1 * 10/2009 Sagar ...................... G06F 16/00
2010/0274982 A1 * 10/2010 Mehr ................. H04L 67/1023 709/224
2010/0332401 A1 * 12/2010 Prahlad .............. G06F 16/1844 711/E12.001

* cited by examiner

*Primary Examiner* — Henok Shiferaw
(74) *Attorney, Agent, or Firm* — IP Business Solutions, LLC

(57) ABSTRACT

In an in-hand apparatus being operated by a user, a display device of the in-hand apparatus displays a list of image forming apparatuses that can access a cloud server, an input device of the in-hand apparatus designates an image forming apparatus selected out of the list according to a selection input, as remote apparatus. When the display device of the in-hand apparatus displays a user box stored in a storage device of the remote apparatus, and the input device of the in-hand apparatus receives an input for selecting a file out of the user box, the remote apparatus transmits the selected file to the cloud server, and the cloud server stores the file and a file name to which information proper to the remote apparatus is added, and the in-hand apparatus receives the file and the file name from the cloud server.

11 Claims, 14 Drawing Sheets

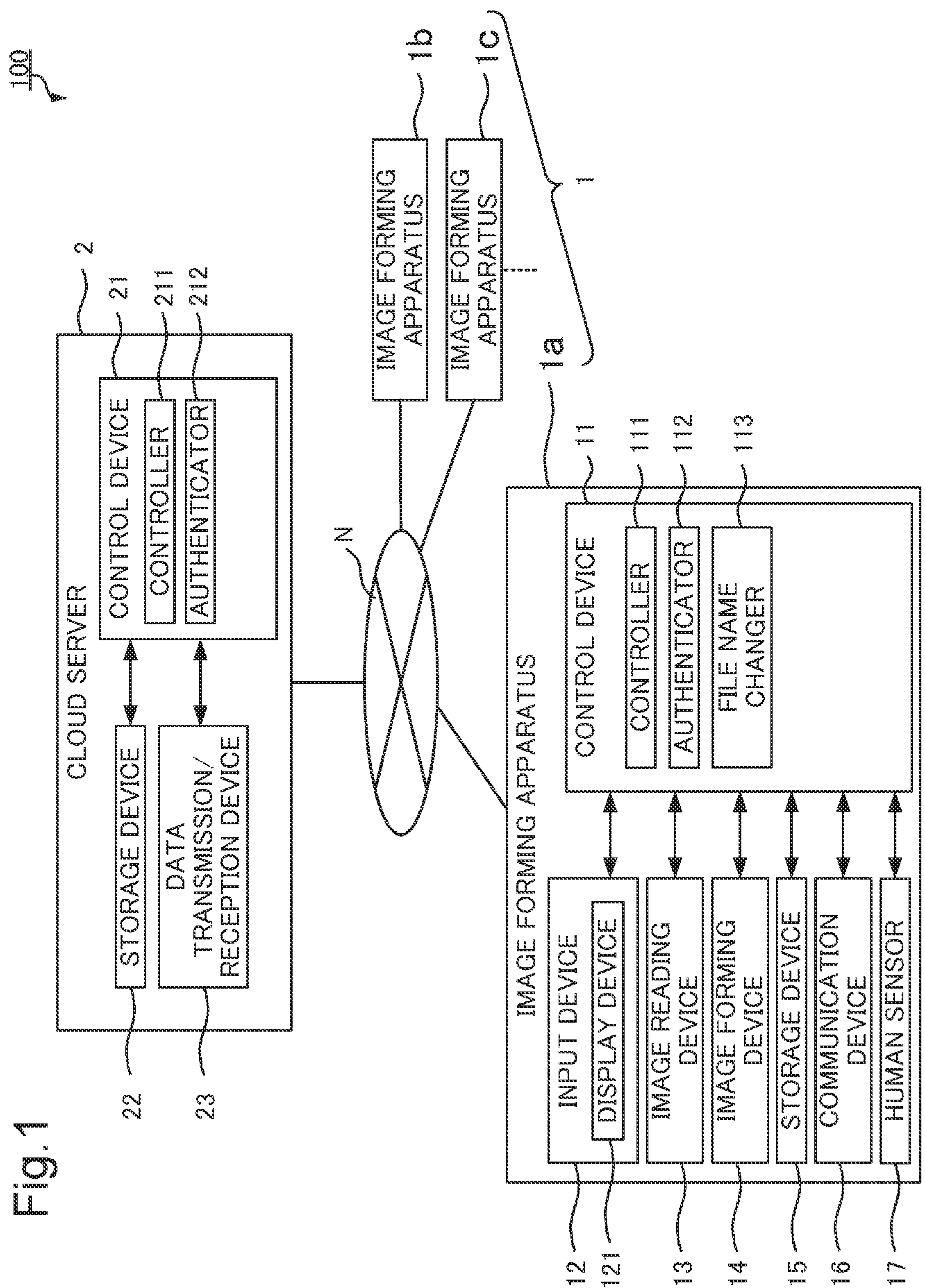
Fig.1
100
CLOUD SERVER
2
CONTROL DEVICE
21
CONTROLLER
211
AUTHENTICATOR
212
STORAGE DEVICE
22
DATA TRANSMISSION/ RECEPTION DEVICE
23
N
IMAGE FORMING APPARATUS
1b
IMAGE FORMING APPARATUS
1c
1
1a
IMAGE FORMING APPARATUS
CONTROL DEVICE
11
CONTROLLER
111
AUTHENTICATOR
112
FILE NAME CHANGER
113
INPUT DEVICE
12
DISPLAY DEVICE
121
IMAGE READING DEVICE
13
IMAGE FORMING DEVICE
14
STORAGE DEVICE
15
COMMUNICATION DEVICE
16
HUMAN SENSOR
17

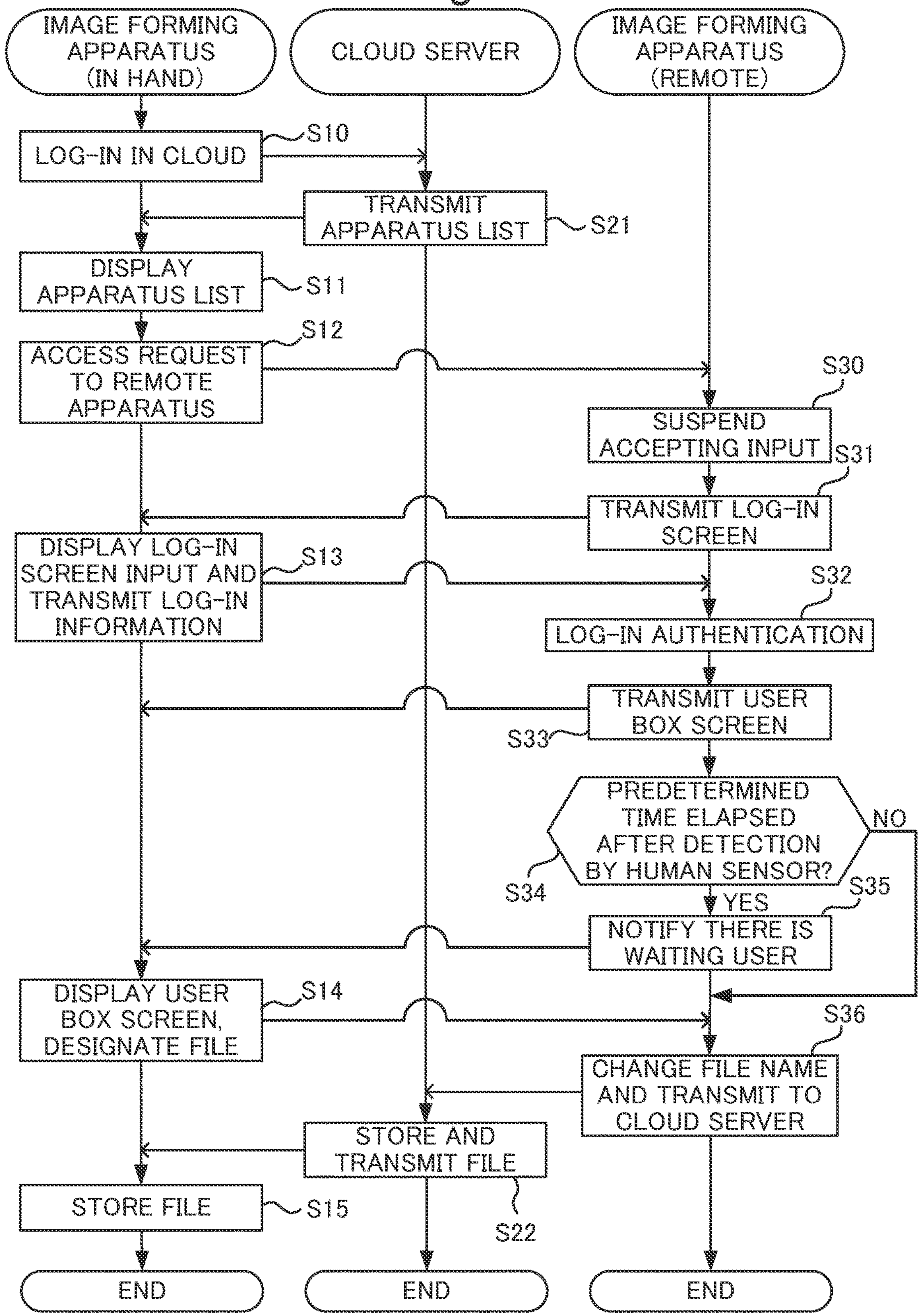
Fig.2
IMAGE FORMING APPARATUS (IN HAND)
CLOUD SERVER
IMAGE FORMING APPARATUS (REMOTE)
LOG-IN IN CLOUD
S10
TRANSMIT APPARATUS LIST
S21
DISPLAY APPARATUS LIST
S11
ACCESS REQUEST TO REMOTE APPARATUS
S12
S30
SUSPEND ACCEPTING INPUT
S31
TRANSMIT LOG-IN SCREEN
DISPLAY LOG-IN SCREEN INPUT AND TRANSMIT LOG-IN INFORMATION
S13
S32
LOG-IN AUTHENTICATION
TRANSMIT USER BOX SCREEN
S33
PREDETERMINED TIME ELAPSED AFTER DETECTION BY HUMAN SENSOR?
NO
S34
YES
S35
NOTIFY THERE IS WAITING USER
DISPLAY USER BOX SCREEN, DESIGNATE FILE
S14
S36
CHANGE FILE NAME AND TRANSMIT TO CLOUD SERVER
STORE AND TRANSMIT FILE
STORE FILE
S15
S22
END
END
END

FILE TRANSFER SYSTEM THAT TRANSFERS FILE AMONG PLURALITY OF IMAGE FORMING APPARATUSES

INCORPORATION BY REFERENCE

This application claims priority to Japanese Patent Application No.2022-119672 filed on Jul. 27, 2022, the entire contents of which are incorporated by reference herein.

BACKGROUND

The present disclosure relates to a file transfer system that transfers a file stored in an image forming apparatus, to another image forming apparatus via a cloud server.

For example, a file transfer system is known that is configured to display a list of image forming apparatuses connected to a cloud server, and enable a user, who is registered as user with respect to one of the image forming apparatuses on the list, to remotely operate that image forming apparatus, using an image forming apparatus available at hand.

SUMMARY

The disclosure proposes further improvement of the foregoing techniques. In an aspect, the disclosure provides a file transfer system including a cloud server, and a plurality of image forming apparatuses connected to the cloud server via a network, and configured to transfer a file among the plurality of image forming apparatuses, via the cloud server. The plurality of image forming apparatuses each include a storage device, a communication device, an input device, a display device, and an apparatus control device. In the storage device, the file is stored. The communication device transmits and receives the file to and from the cloud server. The input device receives an input of an instruction from a user. The display device displays an operation screen. The apparatus control device includes a processor, and acts as an apparatus controller that controls operation of the display device, when the processor executes an operation control program. The cloud server includes a server storage device, a server control device, and a data transmission/reception device. In the server storage device, an apparatus list containing the plurality of image forming apparatuses that can access the cloud server, is stored. The server control device includes a processor, and acts as a server controller that controls operation of the cloud server, when the processor executes a control program. The data transmission/reception device transmits and receives data to and from the plurality of image forming apparatuses. In an in-hand apparatus which is the image forming apparatus being operated by the user among the plurality of image forming apparatus, when the apparatus controller causes the display device to display the apparatus list received by the communication device from the cloud server, and the input device receives a selection instruction for selecting one of the image forming apparatuses on the apparatus list, the communication device transmits an access request to the image forming apparatus designated by the selection instruction. In a remote apparatus which is the image forming apparatus designated by the selection instruction, the communication device transmits, upon receipt of the access request, a file list containing a plurality of the files stored in the storage device, to the in-hand apparatus. In the in-hand apparatus, the apparatus controller causes the display device to display the file list, when the communication device receives the file list, and the communication device transmits, when the input device receives a file selection instruction for selecting one of the files on the file list, the file selection instruction to the remote apparatus. In the remote apparatus, when the communication device receives the file selection instruction, the apparatus controller retrieves the selected file from the storage device, and the communication device transmits the selected file to the cloud server. In the cloud server, when the data transmission/reception device receives the selected file, the server controller stores the file, and a file name, to which information proper to the remote apparatus that has transmitted the file is added, in the server storage device. In the in-hand apparatus, when the communication device receives the file, and the file name to which the information proper to the remote apparatus is added, from the data transmission/reception device of the cloud server, the apparatus controller stores the file, and the file name to which the information proper to the remote apparatus is added, in the storage device.

BRIEF DESCRIPTION OF THE DRAWINGS

FIG. 1 is a block diagram showing a structure and an electrical configuration of a file transfer system;

FIG. 2 is a flowchart showing a process of a file transfer operation; and

DETAILED DESCRIPTION

Figure 3:
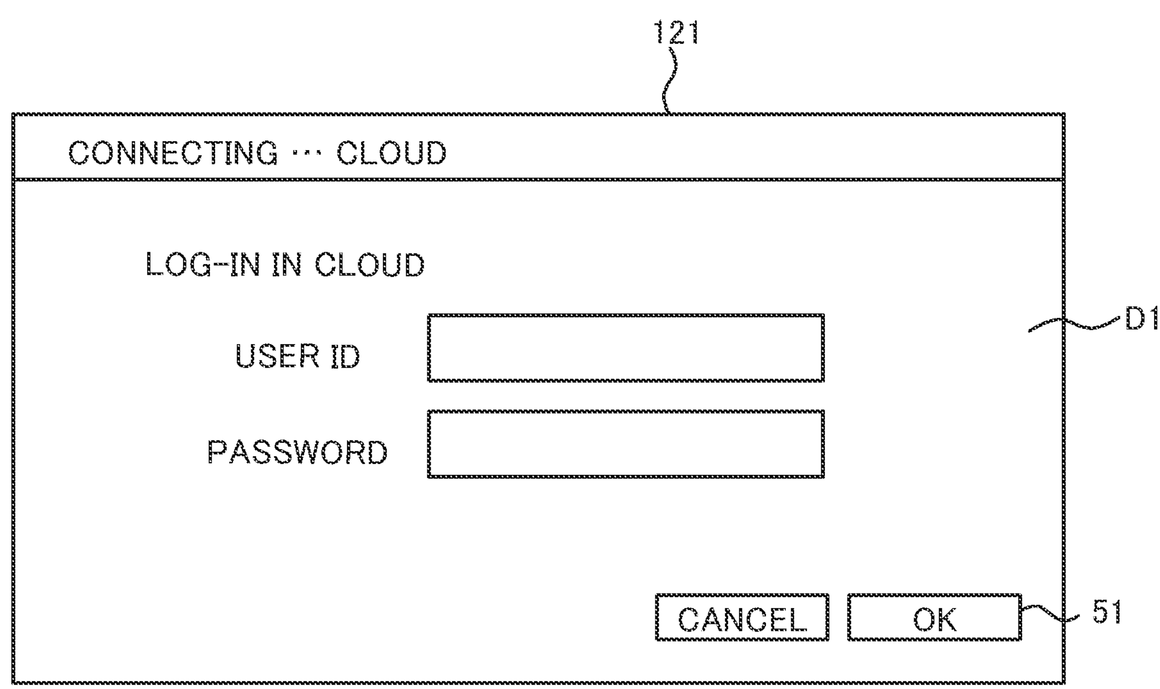
FIG. 3 to FIG. 14 are schematic drawings each showing a content displayed on a display device.

Hereafter, a file transfer system according to an embodiment of the disclosure will be described, with reference to the drawings. FIG. 1 is a block diagram showing a structure and an electrical configuration of a file transfer system according to an embodiment of the disclosure. The file transfer system 100 includes a plurality of image forming apparatuses 1*a*, 1*b*, and 1*c* (hereinafter, collectively "image forming apparatus 1" where appropriate), and a cloud server 2. The image forming apparatus 1 and the cloud server 2 are connected to a network N, so as to transmit and receive files to and from each other. The number of image forming apparatuses constituting the file transfer system 100 is not specifically limited.

The image forming apparatus 1 may be a multifunction peripheral having a plurality of functions, such as copying, printing, scanning, and facsimile transmission, or a single-function apparatus such as a printer or a copier.

The image forming apparatus 1 includes a control device 11, an input device 12, an image reading device 13, an image forming device 14, a storage device 15, a communication device 16, and a plurality of human sensors 17. The input device 12 is located on the front face of an apparatus main body. The input device 12 includes hard keys such as an enter key for confirming operations and settings, and a start key, and a display device 121. The input device 12 receives various instructions, according to user's operation performed on the mentioned keys. The display device 121 serves to display operation screens and messages, and is unified with a touch panel.

The image reading device 13 reads an image of a document, and acquires a document image. The image forming device 14 prints the document image read by the image reading device 13, and data stored in the storage device 15, on a sheet. The storage device 15, exemplifying the storage device in the disclosure, is a large-capacity memory unit, for example constituted of an SSD or HDD, for storing image data, various programs, and data tables. The storage device 15 contains information necessary for user authentication (e.g., user ID and password), and a user box (part of the memory region of the storage device 15) in which the user of the image forming apparatus 1 can store data. The communication device 16 includes a communication module, to perform data communication with an external device, via the network N.

The plurality of human sensors 17 are provided on the front face of the image forming apparatus 1. The human sensor 17 is, for example, an infrared sensor, or a reflective sensor that emits light, such as infrared light, to detect presence of a person, for example standing in front of the image forming apparatus 1, by receiving the light reflected by the person.

When the user transfers a file from an image forming apparatus 1*a* (in-hand apparatus) to an image forming apparatus 1*b* set at a different location (remote apparatus), the image forming apparatus 1*b* suspends accepting an input from another user, while the file transfer operation is being performed. When the image forming apparatus 1*b* becomes unusable for a long time, other users feel inconvenience. The human sensor 17 detects whether any user is about to utilize the image forming apparatus 1*b*.

When the human sensor 17 detects the presence of a person for a predetermined time (e.g., 1 to 3 minutes) or longer, while the image forming apparatus 1*b* is restricted from accepting an input, the communication device 16 of the image forming apparatus 1*b* transmits a signal indicating that there is a waiting user, to the image forming apparatus 1*a*. Upon receipt of the signal from the image forming apparatus 1*b,* the image forming apparatus 1*a* displays a message to the effect that there is a user intending to use the image forming apparatus 1*b,* on the display device 121.

The control device 11 includes a processor, a random-access memory (RAM), and a read-only memory (ROM). The processor is, for example, a central processing unit (CPU), an MPU, or an ASIC. The control device 11 acts as a controller 111, an authenticator 112, and a file name changer 113, when the processor executes a control program stored in the ROM or the like. Here, the cited components of the control device 11 may each be constituted in the form of a hardware circuit, instead of being realized by the operation according to the control program.

The controller 111 serves to control the overall operation of the image forming apparatus 1. The authenticator 112 decides whether the user is permitted to make access to the image forming apparatus 1, on the basis of the identification information of the user (e.g., user ID) and the password. The file name changer 113 adds information proper to the image forming apparatus 1 (e.g., model name) to name of the file, after retrieving the file designated by the user from the storage device 15. The controller 111 exemplifies the apparatus controller in the disclosure.

The cloud server 2 includes a control device 21, a storage device 22, and a data transmission/reception device 23. The control device 21 includes a processor, a RAM, and a ROM. The processor is, for example, a CPU, an MPU, or an ASIC. The control device 21 acts as a controller 211 and an authenticator 212, when the processor executes a control program stored, for example, in the ROM. Here, the cited components of the control device 21 may each be constituted in the form of a hardware circuit, instead of being realized by the operation according to the control program.

The controller 211 serves to control the overall operation of the cloud server 2. The authenticator 212 distinguishes whether the user is permitted to make access to the cloud server 2, on the basis of the identification information of the user (e.g., user ID) and the password. The controller 211 exemplifies the server controller in the disclosure.

The storage device 22 is a large-capacity memory unit, for example constituted of an SSD or HDD, for storing the files. The file is, for example, transmitted from an external device connected to the network N. The data transmission/reception device 23 includes a communication module, to transmit and receive various files, to and from an external device, via the network N. The storage device 22 exemplifies the server storage device in the disclosure.

FIG. 2 is a flowchart showing a process of the file transfer operation according to this embodiment. FIG. 3 to FIG. 14 each illustrate an example of the screen displayed by the display device 121. Hereinafter, the image forming apparatus 1 being directly operated by the user will be referred to as in-hand apparatus, and the image forming apparatus 1 set at a different location from the in-hand apparatus will be referred to as remote apparatus.

When the user wishes to transfer his/her own file stored in the remote apparatus to the in-hand apparatus, the user logs in in the cloud, from the input device 12 of the in-hand apparatus (S10). FIG. 3 illustrates a log-in screen to the cloud server 2, displayed by the display device 121 of the in-hand apparatus.

When the user inputs the user ID and the password through the touch panel, and presses an OK button 51 to input a transmission instruction to the input device 12, while the display device 121 is displaying the log-in screen D1 under the control of the controller 111, the communication device 16 transmits the user ID and the password to the cloud server 2. In the cloud server 2, the data transmission/reception device 23 receives the user ID and the password, and the authenticator 212 decides whether the user is permitted to make access to the cloud server 2, on the basis of the user ID and the password. To be more specific, the authenticator 212 decides that the user is permitted to make access to the cloud server 2, when the user ID and the password accord with the legitimate user ID and password stored in advance.

Figure 4:
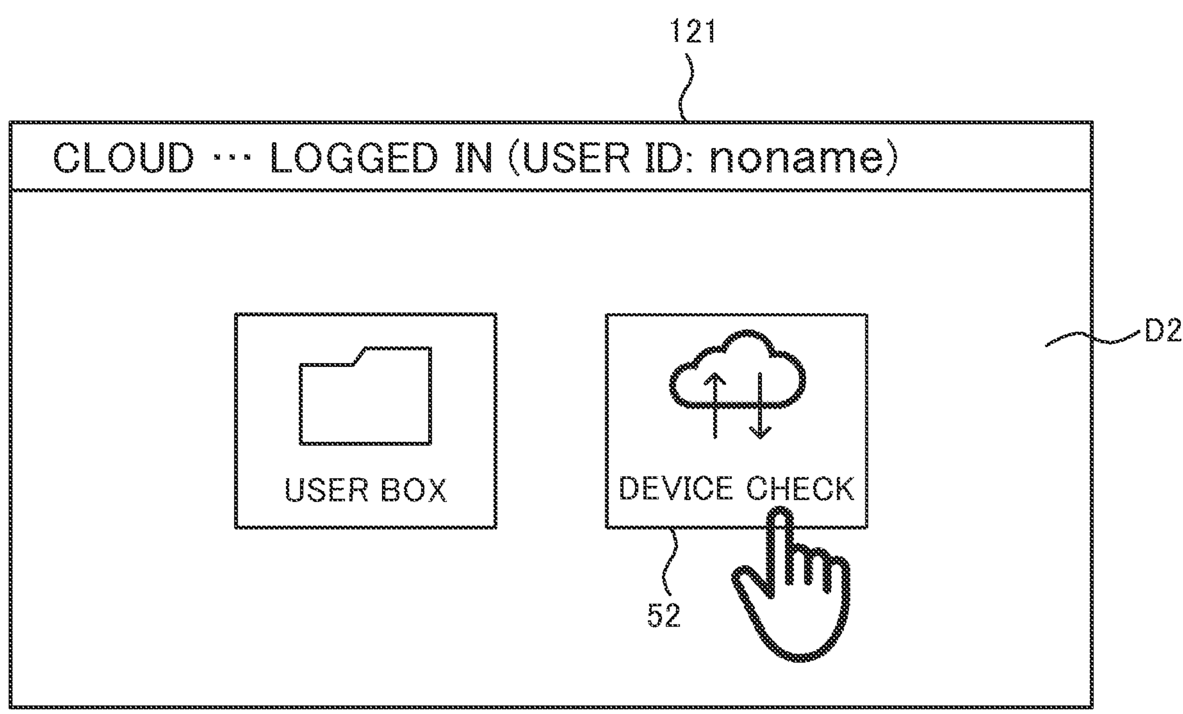

When the authenticator 212 of the cloud server 2 permits the user to log in, the data transmission/reception device 23 of the cloud server 2 transmits an image showing a screen for cloud operation (hereinafter, cloud operation screen), to the in-hand apparatus. FIG. 4 illustrates an example of a cloud operation screen D2, displayed by the display device 121 of the in-hand apparatus. When the user presses down a device check button 52, the input device 12 receives an instruction to transmit an apparatus list, containing the image forming apparatuses 1 that can make access to the cloud server 2. The data transmission/reception device 23 of the cloud server 2 transmits the apparatus list to the in-hand apparatus, according to the transmission instruction (S21). When the communication device 16 of the in-hand apparatus receives the apparatus list, the controller 111 causes the display device 121 to display the apparatus list (S11).

Figure 5:
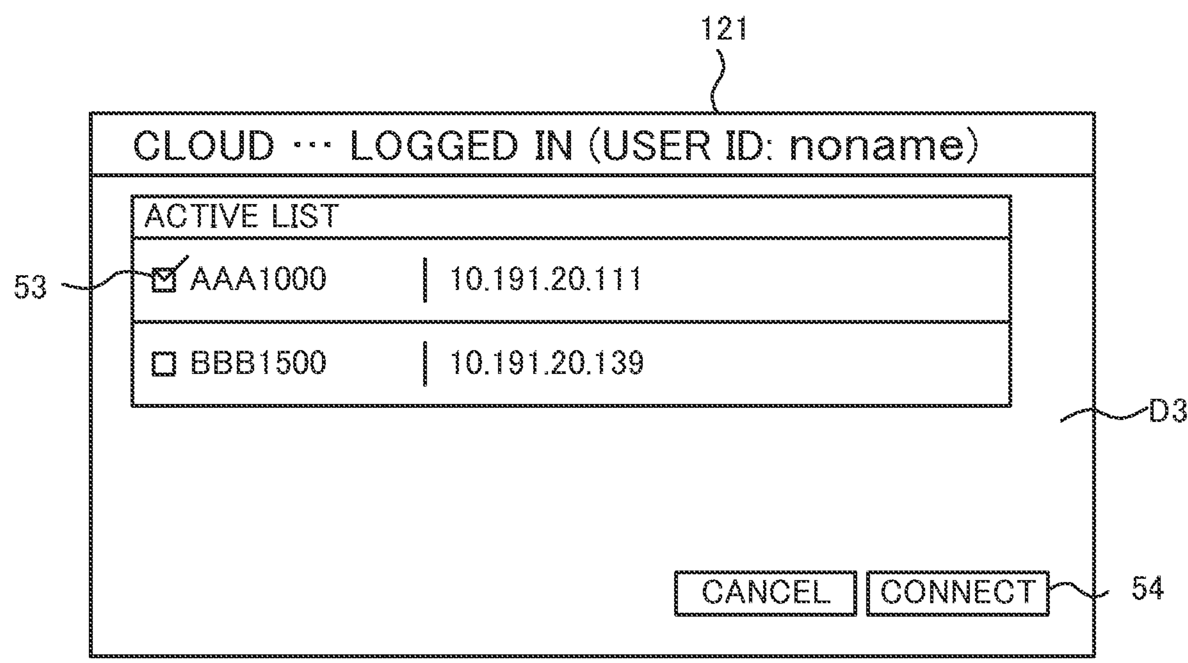

FIG. 5 illustrates an example of the screen showing the apparatus list containing the image forming apparatuses 1 that can make access to the cloud server 2, displayed by the display device 121 of the in-hand apparatus. In view of a list display screen D3, the user selects the image forming apparatus 1 that is the transfer source of the file, out of the apparatus list displayed on the list display screen D3. For example, when the user selects the apparatus named as "AAA1000", and touches a checkbox 53 for the apparatus name "AAA1000", the input device 12 receives an apparatus selection instruction, and the controller 111 causes the display device 121 to display a check mark, at the position where the checkbox 53 is displayed, on the list display screen D3.

When the user presses down a connection button 54, the input device 12 receives an access instruction, and the communication device 16 of the in-hand apparatus makes an access request, to the image forming apparatus 1 (remote apparatus) designated by the selection instruction (S12).

Figure 6:
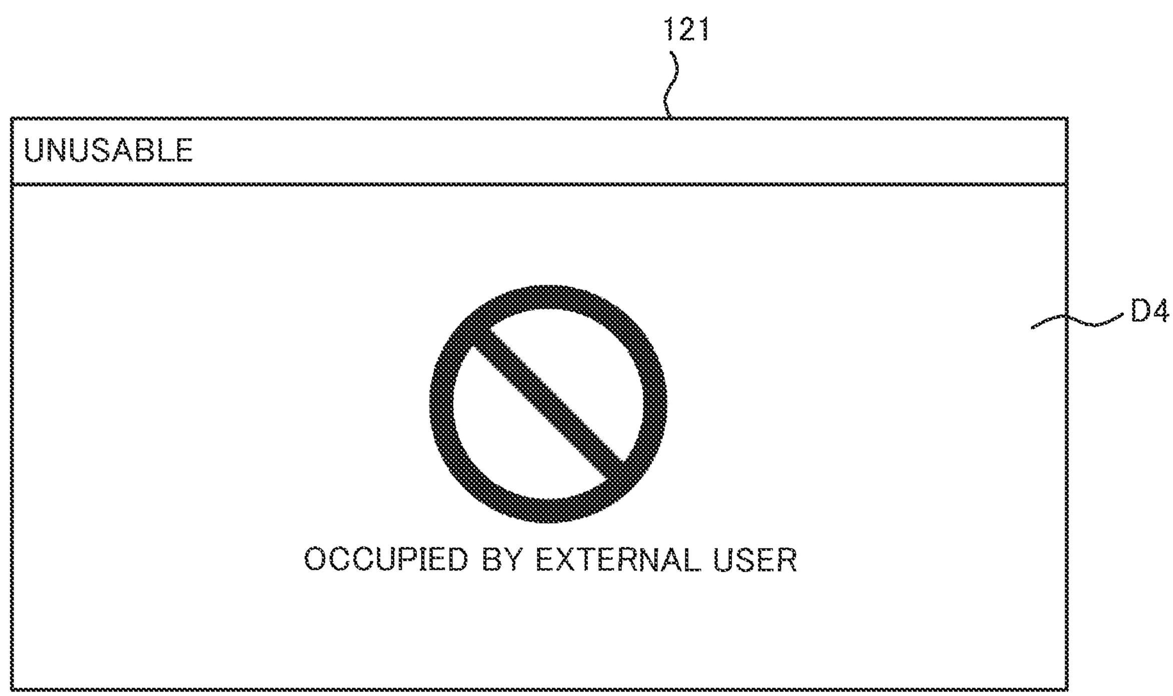

In the remote apparatus, when the communication device 16 receives the access request from the in-hand apparatus, the input device 12 suspends accepting an input from another user (S30). At this point, the controller 111 causes the display device 121 to display a screen D4 announcing that the apparatus is temporarily unusable. FIG. 6 illustrates an example of the screen displayed by the display device 121 of the remote apparatus, while the in-hand apparatus is in contact with the remote apparatus.

Figure 7:
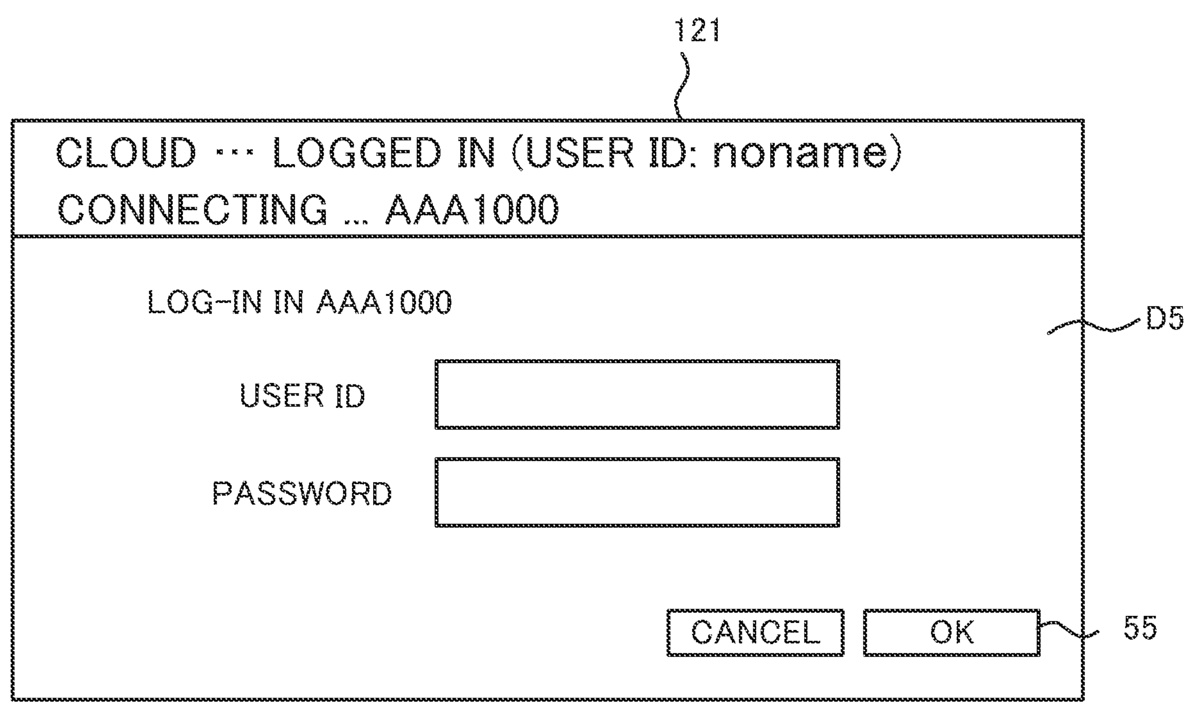

Further, the communication device 16 of the remote apparatus transmits a log-in screen D5 to the in-hand apparatus (S31). In the in-hand apparatus, when the communication device 16 receives the log-in screen D5, the controller 111 causes the display device 121 to display the log-in screen D5 (S13). FIG. 7 illustrates an example of the log-in screen D5 for logging in in the remote apparatus, displayed by the display device 121 of the in-hand apparatus. The user inputs the user ID and the password for logging in in the remote apparatus, through the input device 12.

When the user presses down an OK button 55 after inputting the user ID and the password, the input device 12 receives an authentication request. The communication device 16 of the in-hand apparatus transmits the user ID and the password that have been inputted, and also the authentication request, to the remote apparatus (S13).

In the remote apparatus, when the communication device 16 receives the user ID, the password, and the authentication request, the authenticator 112 decides whether the user is permitted to log in in the remote apparatus, on the basis of the user ID and the password. The authenticator 112 decides that the user is permitted to log in in the remote apparatus, when the user ID and the password accord with the legitimate user ID and password stored in advance.

When the authenticator 112 of the remote apparatus decides that the user is permitted to log in in the remote apparatus, on the basis of the user ID and the password, and permits the user to log in in the remote apparatus, the communication device 16 transmits a user box screen D6 to the in-hand apparatus (S33). The user box screen D6 includes information indicating the file name and the file format, as accompanying information.

Figure 8:
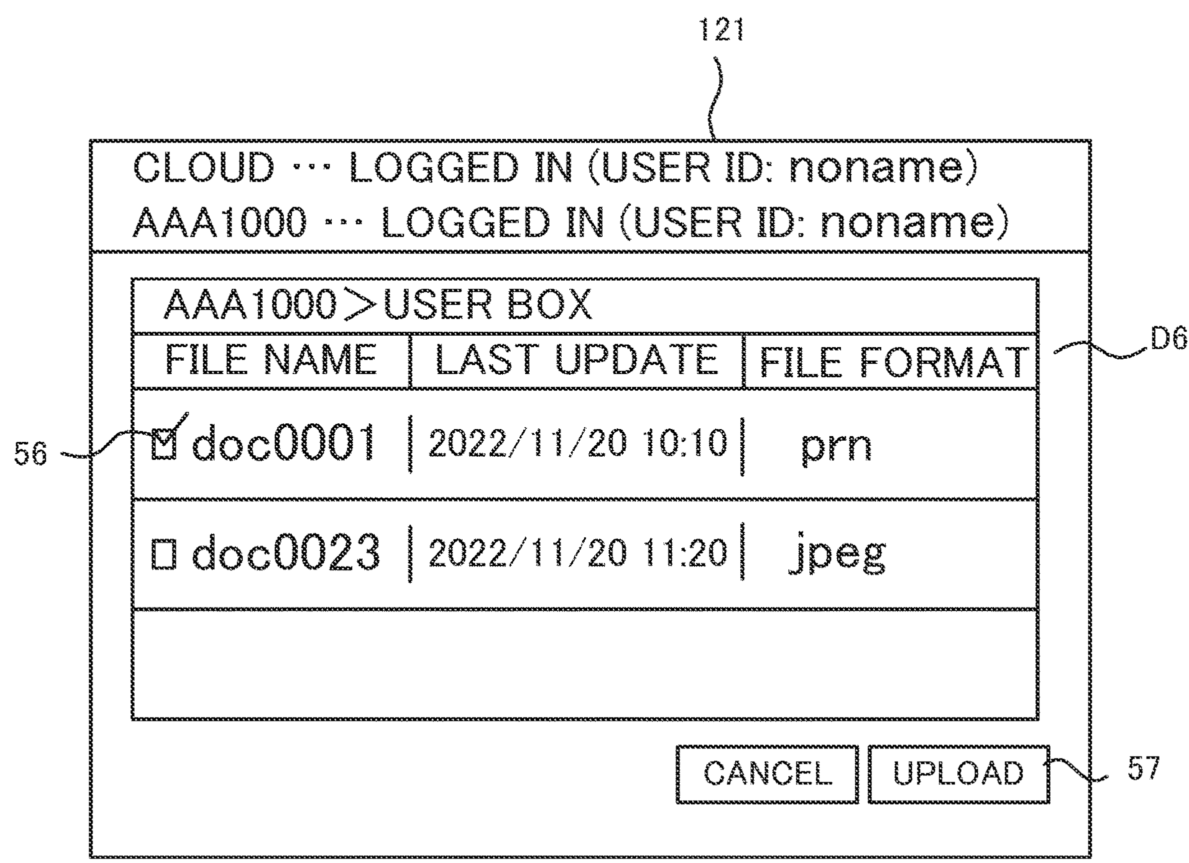

In the in-hand apparatus, when the communication device 16 receives the user box screen D6, the controller 111 causes the display device 121 to display the user box screen D6 (S14). FIG. 8 illustrates an example of the user box screen D6 corresponding to the remote apparatus. The user box refers to a memory region prepared in the storage device 15 of the image forming apparatus 1 with respect to each of the users, and in which a scanned image read by the image reading device 13 or facsimile reception data is temporarily stored. The user box screen D6 exhibits a list of the files stored in the user box, with respect to the authenticated user.

In view of the user box screen D6, the user selects the desired file out of the user box, and touches a checkbox for the desired file, for example a checkbox 56 for the file named as "doc0001". When the user touches the checkbox 56, the input device 12 receives the file selection instruction, and the controller 111 causes the display device 121 to display a check mark in the checkbox 56.

Then, when the user presses down an upload button 57, the input device 12 receives a file transmission instruction. The communication device 16 transmits the file transmission instruction, and the name of the file designated by the file selection instruction, to the remote apparatus. In the remote apparatus, when the communication device 16 receives the file transmission instruction and the file name, the file name changer 113 retrieves the file corresponding to the file name from the storage device 15, and changes the file name by adding thereto a character string proper to the apparatus (identification information indicating the remote apparatus). Then the communication device 16 transmits the file including the file name changed as above, to the cloud server 2 (S36).

Here, when the controller 111 of the in-hand apparatus causes the display device 121 to display the user box screen D6 at S14, the controller 111 may display the user box screen D6 in such a form that rejects the file selection instruction (e.g., gray-out display), for the files other than the files of a predetermined file format, out of the files contained in the file list on the user box screen D6. The predetermined file format may be, for example, a PRN format. In this case, the input device 12 accepts the file selection instruction, only with respect to the files of the predetermined file format, out of the files contained in the file list.

Figure 9:
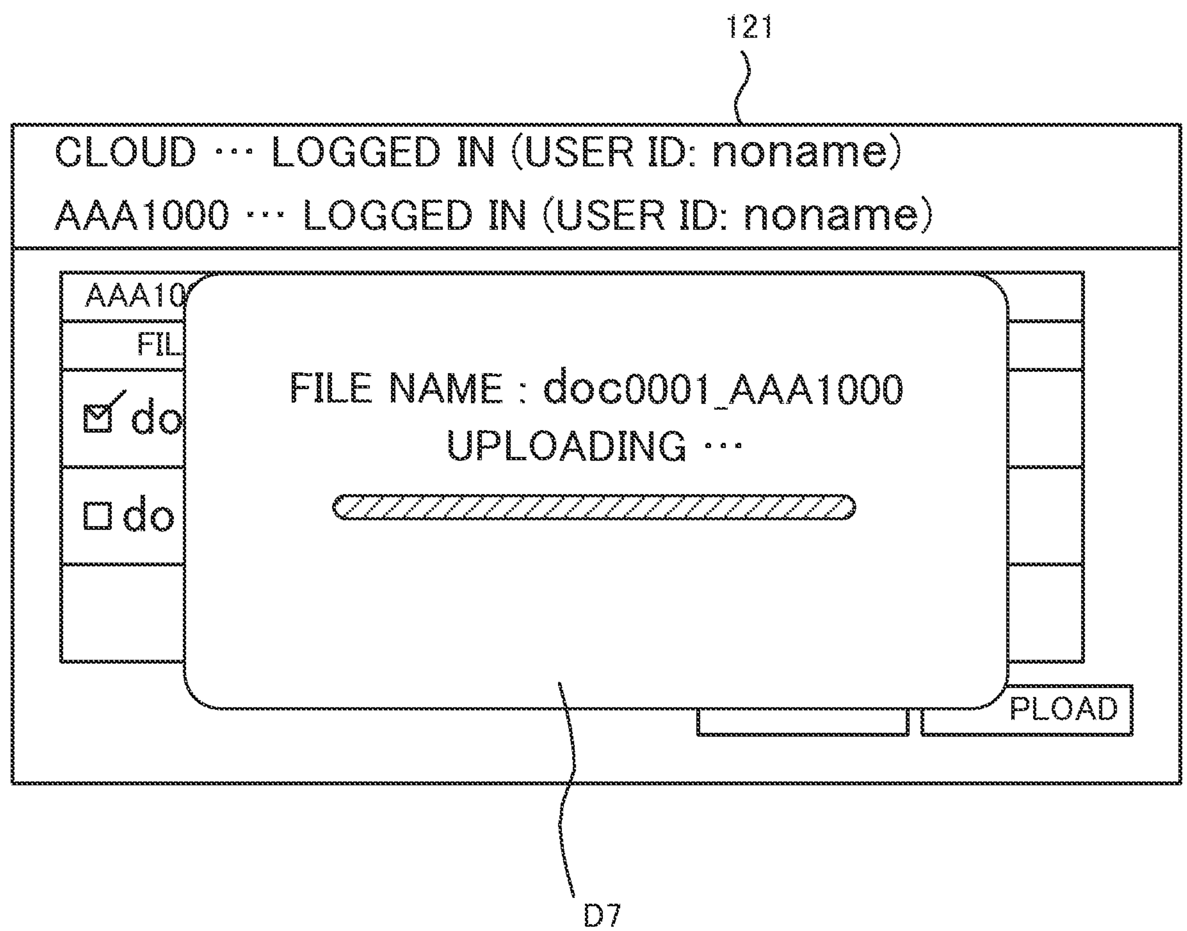

In the cloud server 2, when the data transmission/reception device 23 receives the file having the file name changed as above, the controller 211 stores the file in the storage device 22 (S22). While the communication device 16 of the remote apparatus is transmitting the file designated by the user to the cloud, the controller 111 of the in-hand apparatus causes the display device 121 to display a window D7, notifying that the file is being uploaded. FIG. 9 illustrates an example of the window D7 displayed by the display device 121 of the in-hand apparatus.

The character string proper to the apparatus refers to, for example, the model name or machine name of the image forming apparatus 1 (e.g., AAA1000), determined so as to enable the apparatus that is the transfer source, to be identified. In addition, the file name changer 113 may add the date and time that the file has been retrieved from the storage device 15, to the file name, in addition to the character string proper to the apparatus. In this case, the user can be made aware, upon acquiring the file in the in-hand apparatus, from which remote apparatus the file has been transmitted, and also at which time point the file was retrieved from the storage device 15 of the remote apparatus, in view of the file name.

In this embodiment, as described above, the remote apparatus includes the file name changer 113, which changes the file name by adding thereto the character string proper to the apparatus, and the communication device 16 transmits the file with the changed file name to the cloud server 2 (S36). Instead, the remote apparatus may be without the file name changer 113, but the cloud server 2 may include a file name changer similar to the file name changer 113. In this case, the remote apparatus may transmit, from the communication device 16, the retrieved file and the file name to the cloud server 2, and the file name changer of the cloud server 2 may add, when the data transmission/reception device 23 of the cloud server 2 receives the file and the file name, the information proper to the remote apparatus that has transmitted the file to the file name of the received file, and then the controller 211 may store the file and the file name to which the information proper to the remote apparatus has been added, in the storage device 22. In this case, for example, the control device 21 acts as the controller 211, the authenticator 212, and the file name changer, by executing a control program including changing the file name.

After the user has logged in in the remote apparatus via the in-hand apparatus, the human sensor 17 of the remote apparatus detects whether a person is present in front of the remote apparatus. When the predetermined time has elapsed after the human sensor 17 of the remote apparatus detected the presence of the person (YES at S34), the communication device 16 of the remote apparatus transmits information for notifying that there is a waiting user intending to use the remote apparatus, to the in-hand apparatus (S35).

Figure 10:
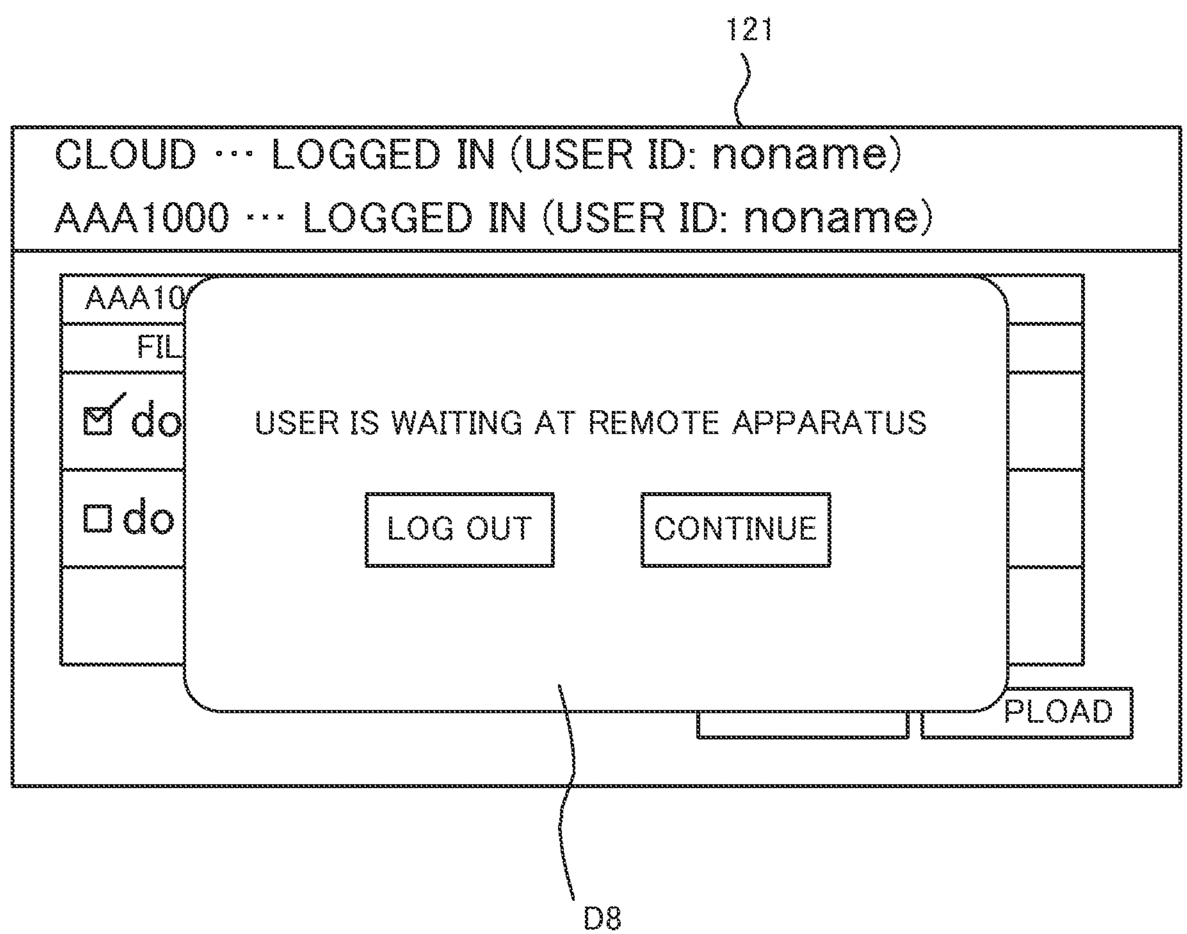

In the in-hand apparatus, when the communication device 16 receives the mentioned information, the controller 111 causes the display device 121 to display a message D8, for the user operating the in-hand apparatus. FIG. 10 illustrates an example of the screen showing the message D8, displayed by the display device 121 of the in-hand apparatus. In view of the message D8, the user operating the in-hand apparatus can be made aware that there is another user wishing to use the remote apparatus.

Figure 11:
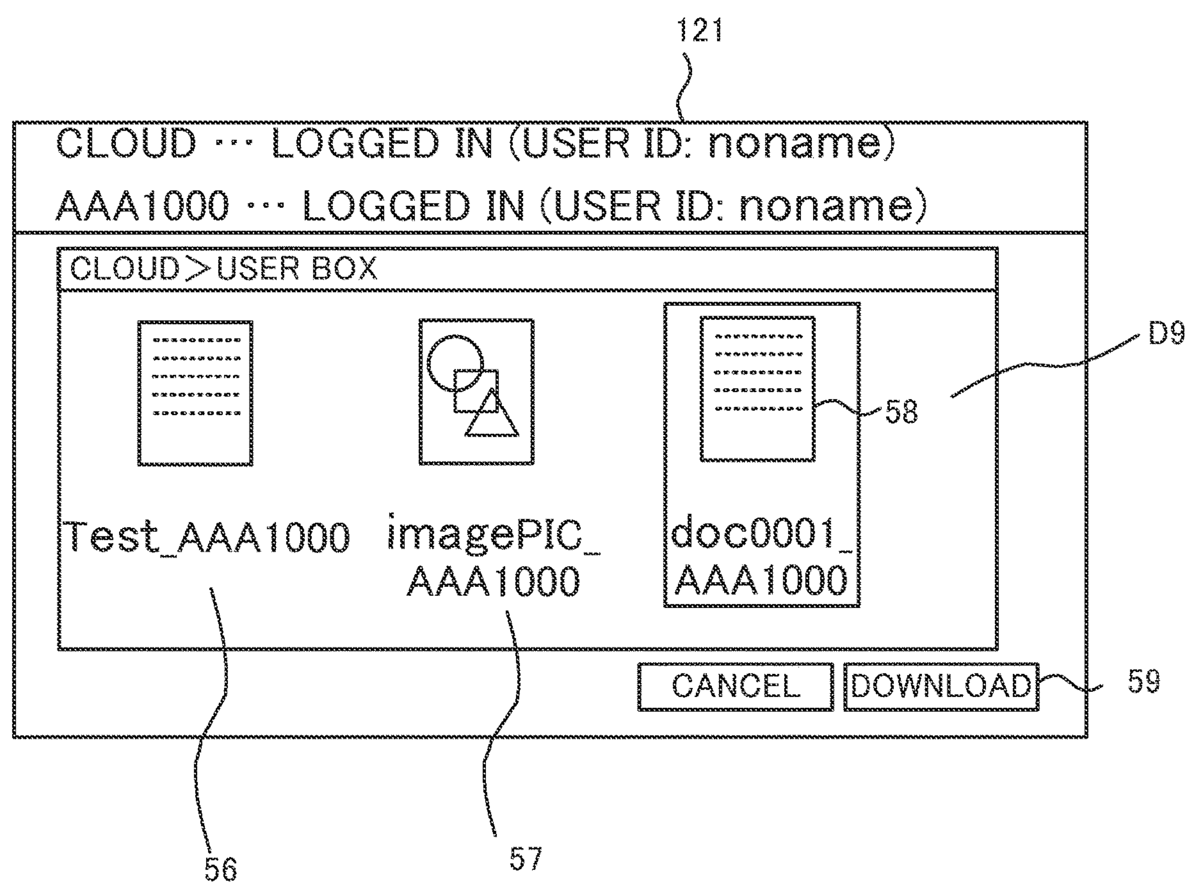
Figure 12:
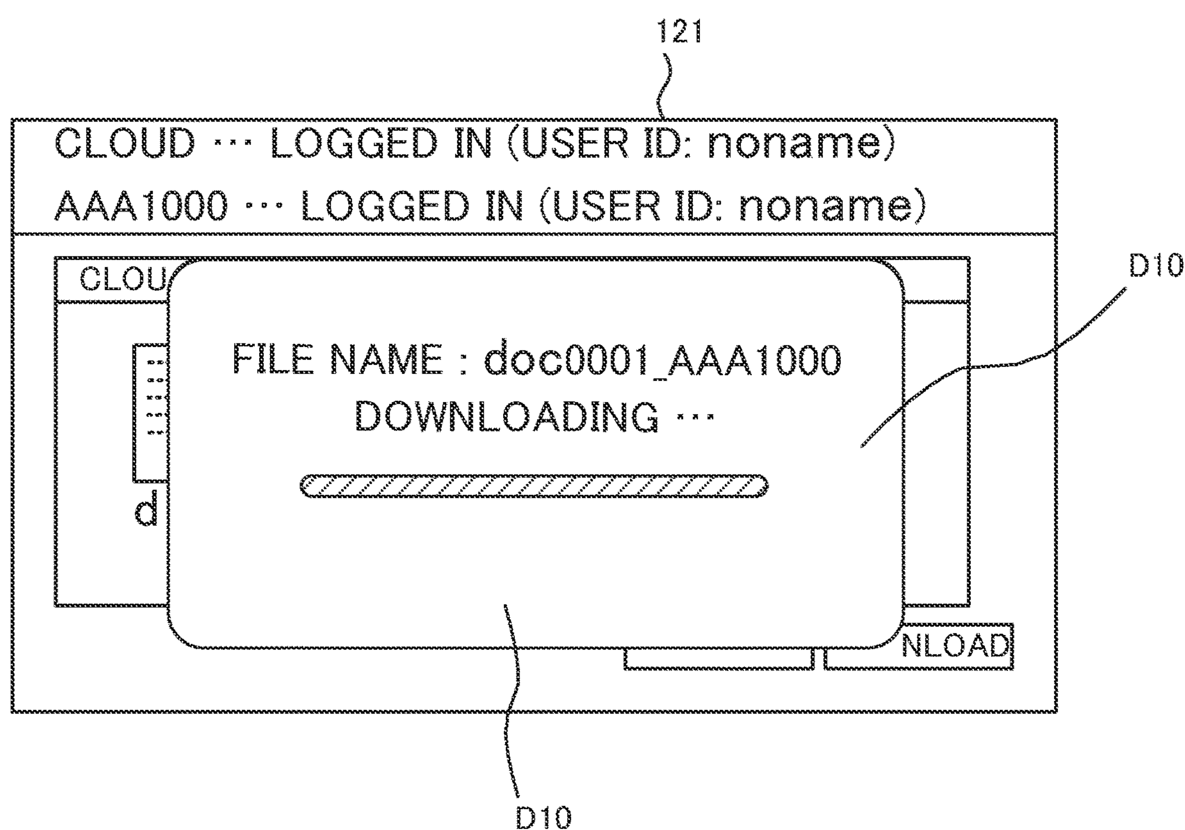

Here, in the cloud server 2, when the communication device 16 receives the file having the changed file name, and the controller 211 stores the file in the storage device 22, the communication device 16 transmits a user box screen D9, showing the file list stored in the user box of the cloud server 2 at this point, to the in-hand apparatus (S22). In the in-hand apparatus, when the communication device 16 receives the user box screen D9, the controller 111 causes the display device 121 to display the user box screen D9. FIG. 11 illustrates an example of the user box screen D9, displayed by the display device 121 of the in-hand apparatus, after the file designated by the user is uploaded to the cloud server 2 from the remote apparatus, and showing the file list stored in the cloud server 2. Icons 56 to 58 each represent the file uploaded from the remote apparatus and stored in the storage device 22 of the cloud server 2.

Then the user selects the icon of the file to be transferred to the in-hand apparatus, touches the icon of the selected file, and presses down a download button 59. In the example shown in FIG. 11, the file represented by the icon 58 is selected by the user. When the user presses down the download button 59 in this state, the input device 12 receives a file designation instruction, and the communication device 16 transmits the file designation instruction to the cloud server 2.

When the data transmission/reception device 23 of the cloud server 2 receives the file designation instruction, the controller 211 retrieves the file designated by the file designation instruction from the storage device 22, and the data transmission/reception device 23 transmits the retrieved file to the in-hand apparatus (S22).

Figure 13:
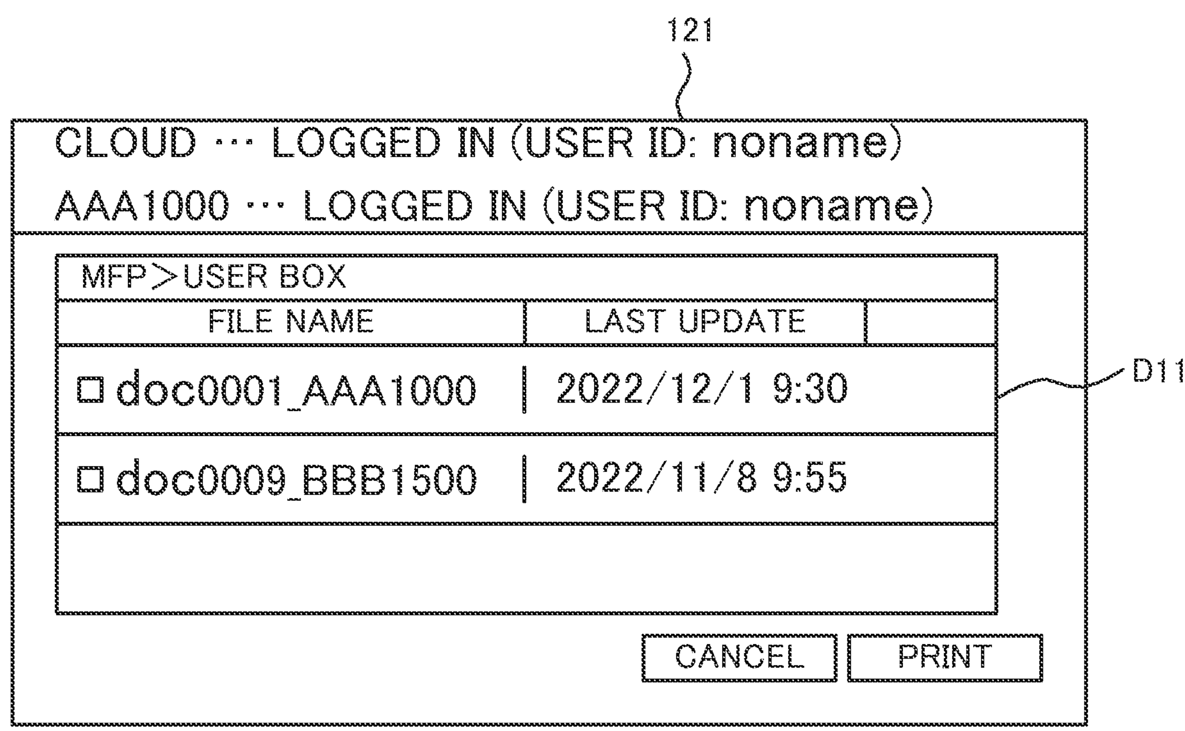

In the in-hand apparatus, when the communication device 16 receives the file from the cloud server 2, the controller 111 stores the received file, in the region of the user box for the user who has logged in, in the storage device 15 (S15). As an example shown in FIG. 12, while the data transmission/reception device 23 of the cloud server 2 is transmitting the file designated by the user to the in-hand apparatus, the controller 111 of the in-hand apparatus causes the display device 121 to display a screen D10 indicating that the file is being downloaded. The controller 111 of the in-hand apparatus causes the display device 121 to display, upon storing the file in the storage device 15, a file list D11 showing the files stored in the user box for the corresponding user, in the storage device 15 of the in-hand apparatus. FIG. 13 illustrates an example of the screen containing the file list D11, showing the files stored in the user box for the corresponding user, in the storage device 15 of the in-hand apparatus.

Figure 14:
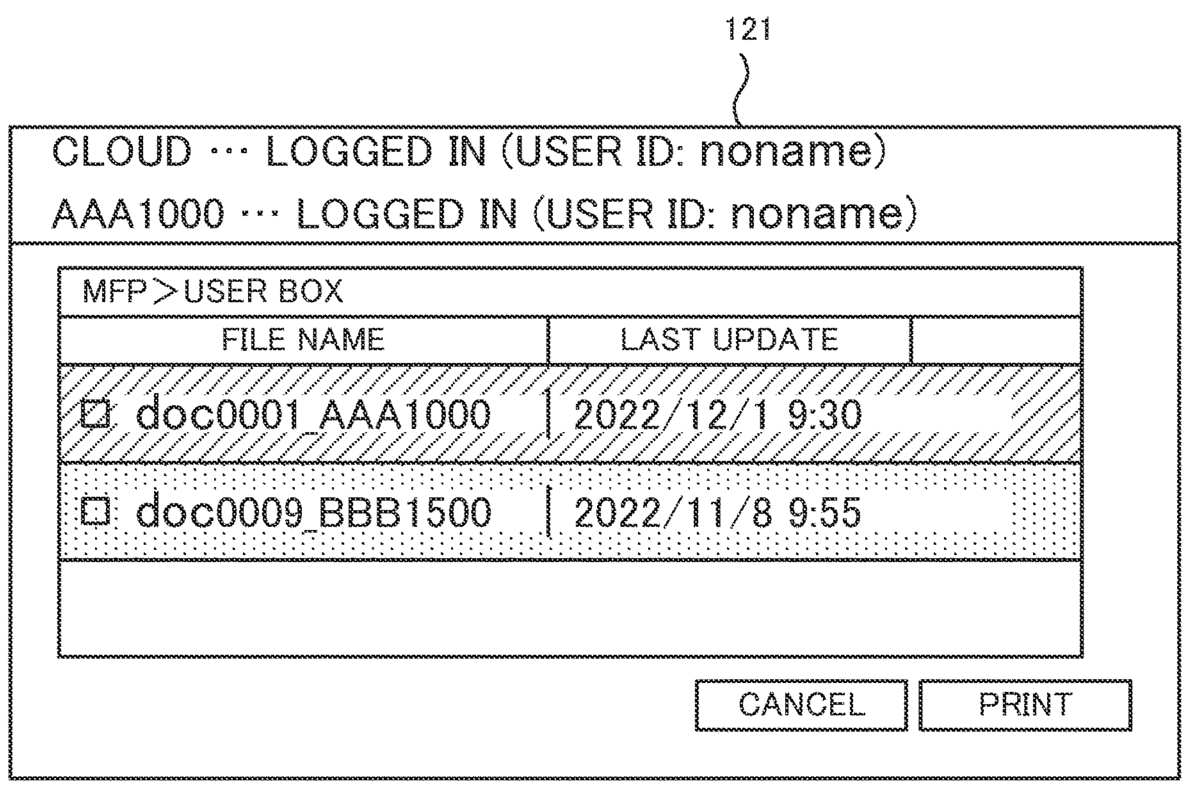

As shown in the file list D11 in FIG. 13, the file name of the transferred file includes the name of the apparatus that is the transfer source (e.g., AAA1000 or BBB1500). Accordingly, the user can immediately identify the apparatus that is the transfer source of each of the files. In addition, as shown in FIG. 14, the controller 111 may cause the display device 121 to display the file names of the respective apparatuses that are the transfer source, in different background colors or in different character colors, to thereby allow the user to easily distinguish the apparatuses that are the transfer source.

With the arrangement according to the foregoing embodiment, as described thus far, the user operating the in-hand apparatus can log in in the remote apparatus set at a different location, and acquire the file in the user box of the remote apparatus, via the cloud server 2. In this process, the file name changer 113 of the remote apparatus adds the character string proper to the apparatus that is the transfer source to the file name, and therefore the user can easily identify the apparatus that is the transfer source of the file, on the in-hand apparatus.

Further, while the user is performing the file transfer operation, after logging in in the remote apparatus from the in-hand apparatus, the input device 12 of the remote apparatus suspends accepting an input. However, since the image forming apparatus 1 includes the human sensor 17, it can be detected that there is another user intending to use the remote apparatus. In addition, when the human sensor 17 of the remote apparatus keeps detecting the presence of a person for a predetermined time or longer, the communication device 16 of the remote apparatus outputs the information for notifying that another user wishing to use the remote apparatus is waiting, to the in-hand apparatus. Then the message based on such information is displayed by the display device 121 of the in-hand apparatus, and therefore the user can be made aware, in view of the message, that there is another person intending to use the remote apparatus.

For example, in the case of the aforementioned existing file transfer system, although the file can be transferred from another image forming apparatus to the in-hand image forming apparatus by remote operation, there may be cases where the image forming apparatus that is the transfer source of the file is unable to be identified, which may incur confusion. With the arrangement according to the foregoing embodiment, in contrast, the file stored in the image forming apparatus set at a distant location can be transferred to the in-hand image forming apparatus, in such a manner that enables the image forming apparatus that is the transfer source of the file to be easily identified.

The disclosure may be modified in various manners, without limitation to the foregoing embodiment. The configurations and processings of the first and second embodiments, described with reference to FIG. 1 to FIG. 14, are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A file transfer system comprising:

a cloud server; and a plurality of image forming apparatuses connected to the cloud server via a network, the file transfer system being configured to transfer a file among the plurality of image forming apparatuses, via the cloud server, wherein the plurality of image forming apparatuses each include:

a storage device in which the file is stored;

a communication device that transmits and receives the file to and from the cloud server;

an input device that receives an input of an instruction from a user;

a display device that displays an operation screen; and an apparatus control device including a processor, and configured to act as an apparatus controller that controls operation of the display device, when the processor executes an operation control program, the cloud server includes:

a server storage device in which an apparatus list, containing the plurality of image forming apparatuses that can access the cloud server, is stored;

a server control device including a processor, and configured to act as a server controller that controls operation of the cloud server, when the processor executes a control program; and a data transmission/reception device that transmits and receives data to and from the plurality of image forming apparatuses, in an in-hand apparatus, which is the image forming apparatus being operated by the user among the plurality of image forming apparatus, when the apparatus controller causes the display device to display the apparatus list received by the communication device from the cloud server, and the input device receives a selection instruction for selecting one of the image forming apparatuses on the apparatus list, the communication device transmits an access request to the image forming apparatus designated by the selection instruction, in a remote apparatus, which is the image forming apparatus designated by the selection instruction, the communication device transmits, upon receipt of the access request, a file list containing a plurality of the files stored in the storage device, to the in-hand apparatus, in the in-hand apparatus, the apparatus controller causes the display device to display the file list, when the communication device receives the file list, and the communication device transmits, when the input device receives a file selection instruction for selecting one of the files on the file list, the file selection instruction to the remote apparatus, in the remote apparatus, when the communication device receives the file selection instruction, the apparatus controller retrieves the selected file from the storage device, and the communication device transmits the selected file to the cloud server, in the cloud server, when the data transmission/reception device receives the selected file, the server controller stores the file, and a file name, to which information proper to the remote apparatus that has transmitted the file is added, in the server storage device, and in the in-hand apparatus, when the communication device receives the file, and the file name to which the information proper to the remote apparatus is added, from the data transmission/reception device of the cloud server, the apparatus controller stores the file, and the file name to which the information proper to the remote apparatus is added, in the storage device.

2. The file transfer system according to claim 1, wherein, in each of the plurality of image forming apparatuses, the apparatus control device further acts as a file name changer that changes the file name of the file, when the processor executes the operation control program, in the remote apparatus, when the communication device receives the file selection instruction, the file name changer retrieves the selected file from the storage device, and adds the information proper to the remote apparatus to the file name of the file, the communication device transmits the selected file and the file name to which the information proper to the remote apparatus has been added, to the cloud server, and in the cloud server, the data transmission/reception device receives the selected file and the file name to which the information proper to the remote apparatus has been added, and the server controller stores the selected file and the file name to which the information proper to the remote apparatus has been added, in the server storage device.

3. The file transfer system according to claim 1, wherein, in the cloud server, the server control device further acts as a file name changer that changes the file name of the file, when the processor executes the control program, the file name changer adds the information proper to the remote apparatus that has transmitted the selected file, to the file name of the selected file, when the data transmission/reception device receives the selected file, and the server controller stores the selected file and the file name to which the information proper to the remote apparatus has been added, in the server storage device.

4. The file transfer system according to claim 1, wherein, in the in-hand apparatus, when the communication device receives the file list, and the apparatus controller causes the display device to display the file list, the apparatus controller creates a display form that rejects the file selection instruction with respect to the files other than the files of a predetermined file format, among the files contained in the file list, and the input device accepts the file selection instruction, only with respect to the files of the predetermined file format, among the files contained in the file list.

5. The file transfer system according to claim 1, wherein, in each of the plurality of image forming apparatuses, the apparatus control device further acts as an authenticator that performs log-in authentication for the user, when the processor executes the operation control program, in the in-hand apparatus, when the input device receives the selection instruction, and user identification information to be used for access authentication to the remote apparatus, the communication device transmits the access request and the user identification information, to the image forming apparatus designated by the selection instruction, through the cloud server, in the remote apparatus, when the communication device receives the access request and the user identification information, the authenticator performs the log-in authentication, and the communication device transmits, when the user indicated by the user identification information is permitted to log in, the file list of the files stored in the storage device, to the in-hand apparatus through the cloud server.

6. The file transfer system according to claim 5, wherein the communication device of the remote apparatus transmits, when the user indicated by the user identification information is permitted to log in, the file list of only the files stored in association with the user indicated by the user identification information, among the files stored in the storage device, to the in-hand apparatus through the cloud server.

7. The file transfer system according to claim 1, wherein the information proper to the remote apparatus includes a character string representing a name of the remote apparatus.

8. The file transfer system according to claim 7, wherein the file name changer of the remote apparatus further adds a character string representing a date and time that the selected file was retrieved from the storage device of the remote apparatus, to the file name of the file.

9. The file transfer system according to claim 1, wherein, in the in-hand apparatus, when the apparatus controller causes the display device to display the file list of the files stored in the storage device, after storing the file and the file name to which the information proper to the remote apparatus has been added, received from the cloud server, in the storage device, the apparatus controller causes the display device to further display information indicating the remote apparatus that is a transmission source of the file, with respect to the file transmitted from the remote apparatus.

10. The file transfer system according to claim 9, wherein, when the apparatus controller of the in-hand apparatus causes the display device to display the file list, the apparatus controller creates different display forms for each of the remote apparatuses that are a transfer source, with respect to the files transmitted from the remote apparatus.

11. The file transfer system according to claim 1, wherein the plurality of the image forming apparatuses each further include a human sensor, in the remote apparatus, the input device suspends accepting an input, while communicating with the in-hand apparatus via the cloud server, and when a time during which the human sensor is detecting a person reaches a predetermined time, the communication device transmits information indicating that there is a waiting user, to the in-hand apparatus via the cloud server.

* * * * *